United States Patent Office 2,796,350
Patented June 18, 1957

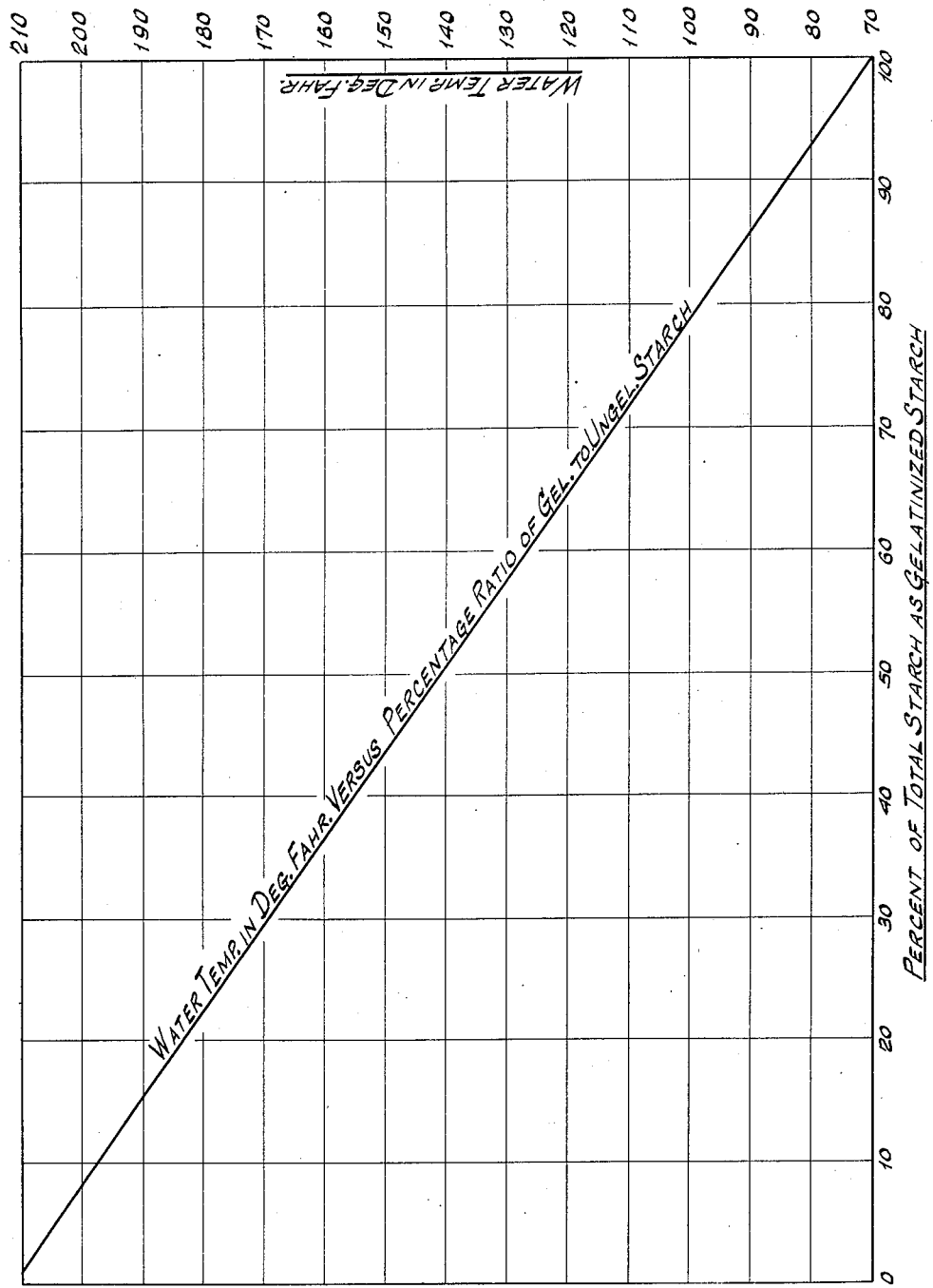

2,796,350

METHOD OF MAKING FRENCH CRULLERS

Percy G. Grennan, West Orange, N. J., and Zenas Block, Larchmont, and Abraham H. Goodman, Great Neck, N. Y., assignors to DCA Food Industries Inc., New York, N. Y., a corporation of New York Application August 14, 1953, Serial No. 374,238

3 Claims. (Cl. 99—92)

The present invention relates generally to an improved dry mix for the preparation of bakery products and to an improved method for producing such bakery products. More particularly, the present invention relates to an improved dry mix useful in the preparation of French crullers and similar comestibles and to an improved method for producing French crullers and the like.

In accordance with the conventional method of preparing French crullers and similar pastries, it is necessary to cook a mixture of flour, shortening, water and salt, generally in a steam jacketed kettle, for a period of one to ten minutes to produce a paste of the required consistency. The paste is permitted to cool below the cooking temperature and is then placed in a mixing bowl, to which liquid eggs, dry milk and ammonium carbonate or bicarbonate are then added. After mixing these ingredients for several minutes, the resulting dough is shaped and fried in deep fat. This method possesses numerous drawbacks and disadvantages resulting in an expensive product. In addition to the extensive equipment requirements, numerous handlings of the various ingredients and intermediate products and the high consumption and expenditure of time, labor and energy, this method is not subject to close process control and depends much too much upon the human factor. Uniformity of product is extremely difficult under such conditions. For example, the cooking step produces great variability in dough consistencies and in quality, as well as causing alterations in the amount of egg that must be added, thereby making it difficult or impossible to maintain close cost control. Prepared dry mixes have been proposed for the preparation of French crullers but these do nothing toward reducing the cost of the finished product. These prepared mixes require not only those steps necessary in the conventional production of French crullers but the additional step of drying the prepared mix for distribution.

It is thus a principal object of the present invention to provide an improved method for the production of comestibles.

Another object of the present invention is to provide an improved method for preparing baked products.

Still another object of the present invention is to provide an improved method for preparing French crullers, eclairs, cream puffs and similar pastries normally requiring a cooking step in the preparation of the dough.

A further object of the present invention is to provide an improved method for producing French crullers in which the conventional cooking step normally required in the preparation of the dough is obviated.

Still a further object of the present invention is to provide an improved method for the production of French crullers which method is simple and requires a minimum of equipment and specialized skills, consumes little time and energy and is subject to close process and cost control.

Another object of the present invention is to provide an improved dry mix for the preparation of French crullers and similar pastries.

Still another object of the present invention is to provide an improved dry mix for the production of French crullers and the like which dry mix requires no cooking in its preparation or in its use in producing French crullers and the like.

A further object of the present invention is to provide a simple, improved method for producing French crullers of uniform superior quality and attractive appearance.

The above and further objects and advantages of the present invention will appear more fully from a reading of the following description, together with the accompanying drawing which illustrates a graph of optimum temperature of water employed in forming the batter against the ratio of gelatinized to ungelatinized starch.

An important feature of the present invention is predicated upon the discovery that by substituting starch, preferably a mixture of gelatinized and ungelatinized starch, for the wheat flour generally employed in the production of French crullers and similar pastries, the step of cooking the dough is completely obviated, with the attendant numerous advantages realized as a result of the omission of this step. A small amount of untreated wheat flour may be tolerated, but this ingredient should in no event be present in excess of five percent and preferably in an amount of less than two percent, or else an undesirable darkening of the crust of the pastry occurs together with a crust character which renders the finished product unsalable.

While any blend of gelatinized and ungelatinized starch may be substituted for the untreated wheat flour to great advantage, it has been found that as the percentage of ungelatinized starch increases the required temperature of the water employed in preparing the paste or batter ranges from approximately room temperature, that is about 70° F. for all gelatinized starch, to a temperature close to 212° F. for all ungelatinized starch. The proportion of gelatinized starch may vary from 0%–75% and of ungelatinized starch from 0%–80%.

The graph illustrated in the drawing is self-explanatory, and demonstrates the optimum or preferred temperature of the water employed in forming the dough, plotted against the ratio of the gelatinized to ungelatinized starch. It should be noted that the graph is substantially linear, the temperature decreasing with the increase in the percentage of starch, gelatinized.

While not absolutely essential, it is highly desirable, however, to include in the mixture a suitable shortening which should preferably be present in amounts between 15% and 35% of the batter forming mixture. The function of the shortening is primarily to tenderize the finished product. Another ingredient which may be included to great advantage in the batter forming mixture is a water soluble or dispersible heat coagulable protein in amounts preferably between ½% and 20%. While this protein is not essential to produce a product that looks like a French cruller, it is necessary for producing a pastry that possesses the consumer acceptance qualities required in terms of fat absorptions, volume and crust characteristics. The starches, together with the shortening and protein if desired, may be prepared as a so-called dry mix, thus affording an added convenience. The dry mixture is merely combined with water in the required amount and eggs added thereto while continuing the mixing. The dough is now ready for forming and frying in the conventional manner. It is readily apparent that this new method is much more convenient and much simpler than the conventional methods of preparing similar pastry doughs. Furthermore, dehydrated eggs may be included in the dry mix in amounts replacing in whole or in part the liquid eggs which are added to form the dough. In employing the dehydrated eggs, the water used is correspondingly increased and the liquid eggs decreased or entirely omitted.

Examples of dry mixes in accordance with the present invention which may be employed in the present improved process are as follows:

*Example No. 1*

| | Percent |
|---|---|
| Ungelatinized starch | 77.0 |
| Shortening | 22.0 |
| Salt | 1.0 |

*Example No. 2*

| | |
|---|---|
| Gelatinized starch | 69.0 |
| Shortening | 30.0 |
| Salt | 1.0 |

*Example No. 3*

| | |
|---|---|
| Gelatinized starch | 45 |
| Ungelatinized starch | 18 |
| Shortening | 25 |
| Proteins | 11 |
| Salt | 1 |

In preparing the above mixes, the dry ingredients are combined and the shortening may be creamed in with the dry ingredients or may be sprayed in a liquid state.

The methods of utilization of the dry mixes specified in the above examples in accordance with the present invention may be as follows:

1. 100 parts of the composition of Example No. 1 and 110 parts of boiling or close to boiling water are mixed for three minutes in a three-speed Hobart mixer set at second speed. To the resulting batter are added 75 parts of liquid whole egg and the mixing continued at the same speed for an additional three minutes. The dough is then formed and fried in deep fat in the conventional manner.

2. 100 parts of the composition of Example No. 2 and 130 parts of water at approximately 90° F. are mixed for three minutes in a three-speed Hobart mixer set at second speed. To the resulting batter are added 75 parts of liquid whole egg and the mixing continued at the same speed for an additional three minutes. The dough is then formed and fried in deep fat in the conventional manner.

3. 100 parts of the composition of Example No. 3 and 130 parts of water at 100° F.–110° F. are mixed for three minutes in a three-speed Hobart mixer set at second speed. To the resulting batter are added 75 parts of liquid whole egg and the mixing continued at second speed for an additional period of from four to six minutes. The dough is then formed and fried in deep fat in the usual manner. Lower quantities of egg may be employed than indicated above with or without the addition of ammonium carbonate or ammonium bicarbonate as a leavening.

While the above examples illustrate the use of ungelatinized starch alone, gelatinized starch alone or a mixture of the two, it should be pointed out that although highly satisfactory results may be obtained employing either gelatinized or ungelatinized starch far superior products are uniformly achieved when a mixture of gelatinized and ungelatinized starch is employed, particularly in the presence of the indicated proteins. The ratio of gelatinized starch to ungelatinized starch should preferably not exceed 12 to 1.

Examples of starches which may be used are corn, wheat, rice, tapioca and potato. In addition to the purified starches mentioned, corn flour, rice flour, tapioca flour and potato flour may likewise be used. However, the presence of untreated wheat flour in quantities exceeding 5% results in an unsuitable end product. Proteins which may be employed include corn proteins, soya proteins, milk proteins—either casein or other factions of milk proteins such as lactalbumen—egg albumen and derivatives of these proteins that remain water soluble and heat coagulable. As a shortening one or more of the following may be used: liquid refined oil, hydrogenated vegetable or animal shortening, and emulsified shortenings, either in liquid or solid state.

It should again be pointed out that dehydrated eggs may be included in the above examples of dry mixes in amounts corresponding in whole or in part to the liquid eggs employed in forming the dough. Thus, the liquid eggs used are accordingly decreased or omitted and additional water employed to compensate for the difference in producing the dough.

While there has been described preferred embodiments of the present invention, it is apparent that numerous alterations and omissions may be made without departing from the spirit thereof.

We claim:

1. The method of producing French crullers comprising the steps of mixing gelatinized starch, ungelatinized starch, water, shortening, egg and a water soluble protein in addition to said egg, in the absence of any steps promoting the substantial degradation of said protein, thereby to produce an uncooked dough, forming said uncooked dough into shaped articles, and frying said shaped articles.

2. The method in accordance with claim 1, wherein the ratio of said gelatinized starch to said ungelatinized starch does not exceed 12 to 1.

3. The method in accordance with claim 1, wherein said water soluble protein constitutes between ½% and 20% of the dry ingredients forming said dough.

References Cited in the file of this patent

UNITED STATES PATENTS

| 855,599 | Wagner | June 4, 1907 |
| 1,063,177 | Andrews | June 3, 1913 |
| 2,567,815 | Kipnis | Sept. 11, 1951 |